Patented Dec. 31, 1929

1,742,030

UNITED STATES PATENT OFFICE

CLAYTON W. FARBER, OF BOWMANSTOWN, PENNSYLVANIA, ASSIGNOR TO THE NEW JERSEY ZINC COMPANY, OF NEW YORK, N. Y., A CORPORATION OF NEW JERSEY

ZINC SULPHIDE

No Drawing.  Application filed June 16, 1927.  Serial No. 199,405.

This invention relates to the manufacture of pigment zinc sulphide and has for its object the provision of certain improvements in the manufacture of zinc sulphide for pigment purposes.

The improved process of the invention involves precipitation of zinc sulphide by mixing solutions of zinc chloride and barium sulphide. The chemical reaction taking place is represented by the following equation:

$$ZnCl_2 + BaS = ZnS + BaCl_2$$

The zinc sulphide precipitate is carefully washed and dried. The dried precipitate is then calcined at an appropriate elevated temperature and suddenly cooled, by plunging (quenching) into cold water. The calcined and quenched product is then milled, dried and distintegrated to prepare the commercial zinc sulphide pigment. The present invention is particularly characterized by the regulation and control of certain manipulative steps and conditions in this manufacturing process which singly or in combination affect or influence the quality or properties of the finished zinc sulphide pigment.

The zinc chloride solution or liquor empolyed in practicing the invention may be prepared in any appropriate manner. I find it convenient to prepare this solution by dissolving any available zinc-bearing material, such as refuse zinc oxide, ore, etc., in hydrochloric acid and purifying the resulting solution. The zinc chloride solution may be purified in much the same manner that zinc sulphate solution is purified in lithopone manufacture. I prefer to employ potassium permanganate for the removal of iron and manganese. The precipitated iron and manganese is removed by filtering, and the filtrate is then treated with zinc dust and sheet zinc for the removal of heavy metals, such as cadmium, copper, cobalt, etc. In my preferred practice, the purified zinc chloride solution is of a relatively high concentration, being about 50–60° Bé.

The barium sulphide solution or liquor employed in practicing the invention may be prepared in accordance with the now customary practice in lithopone manufacture. In my usual practice, I employ a barium sulphide solution of about 14° Bé'. It is highly desirable to keep the ratio of hydrate to sulphydrate in this solution as high as practicable.

The purified zinc chloride solution is highly basic, and on this account I find it desirable to add the equivalent of about 2 pounds of hydrochloric acid to each 1000 pounds of 50° Bé'. purified zinc chloride solution. The purified zinc chloride solution is first run into the precipitating tank. The barium sulphide solution is then added to the tank until the desired endpoint has been reached. The hydrochloric acid may be added to the purified zinc chloride solution at any appropriate stage and in any apropriate manner prior to the introduction of the barium sulphide solution into the precipitating tank.

The liquors in the precipitating tank are preferably maintained at a temperature in excess of 75° C., and preferably about 80° C. or slightly higher, and are gently stirred for from 1½ to 2 hours. The endpoint of the precipitating reaction is determined by titrating the filtrate from a sample of the crude pulp with 0.1 N (one-tenth normal) iodine solution (iodine dissolved in an aqueous solution of potassium iodide). This titration test indicates and establishes a predetermined excess of barium sulphide in the precipitating liquors at the endpoint or completion of the reaction. In my preferred practice, 25 cc. of the filtrate from a sample of the crude pulp is titrated with 0.1 N iodine solution, and the endpoint is reached and determined when from 1.0 to 1.5 cc. of the iodine solution is used in the titration test. These particular figures for the titration test apply to a zinc chloride solution of 50 to 60° Bé'. and a barium sulphide solution of about 14° Bé'. It is to be understood that the invention is not limited to the use of solutions of these particular concentrations. What the invention contemplates in this respect is an excess of barium sulphide in the crude pulp at the endpoint of the precipitating step substantially equivalent to the figures specified.

The reacting zinc chloride and barium sulphide solutions are preferably mixed or stirred with as little agitation as practicable. All stirring devices that violently agitate the precipitating liquors are avoided. A certain degree of stirring or equivalent method of mixing must be employed in order to bring about the necessary contact between the two reacting solutions, but this stirring, or equivalent method of mixing, is preferably conducted as gently as practicable and with the minimum agitation of the precipitating liquors. Thus, for example, in the precipitation of the crude zinc sulphide in a cylindrical tank approximately 15 feet in diameter and 7 feet deep provided with rotatable stirring devices such as commonly used in the lithopone industry, the desired gentle stirring can be accomplished by rotation of the stirrers at about 5 R. P. M. I have found that with such gentle stirring the precipitated zinc sulphide, as well as the finished product, contains a preponderance of uniformly aggregated secondary particles made up of from 2 to 8 individual primary particles. Such a preponderance of uniformly aggregated particles imparts to the pigment zinc sulphide superior properties of hiding power and brightness.

The crude pulp consists of the precipitated zinc sulphide suspended in the resulting barium chloride solution. When the precipitating reaction is completed, as indicated by the titration test, the crude pulp is diluted with one part of water per one part of pulp. This dilution with water should take place promptly after the completion of the precipitating reaction, and not later than two hours thereafter. The dilution with water reduces the chlorine concentration per unit volume of the crude pulp. Before dilution, the chlorine concentration in the crude pulp is so high that objectionable amounts of chloride are adsorbed by the precipitate. This adsorbed chloride is then carried over to the calcining operation and deleteriously affects the light resistance of the calcined product. After dilution with water, the pulp can stand almost indefinitely without injurious effects.

The diluted pulp is next allowed to settle and the supernatant liquor is decanted off in amount substantially equivalent to the amount of diluting water added. The resulting crude pulp is again diluted and again subjected to settling and decantation and these steps are repeated until the chlorine content of the water in which the crude zinc sulphide is suspended is not more than 0.5 grams of chlorine per liter, and preferably from 0.1 to 0.2 grams per liter. In practice, under the conditions hereinbefore specified, I have found that about six dilutions are necessary to reduce the chlorine content to the desired optimum figure.

If desired, the crude pulp, after the initial dilution, may be washed by counter-current decantation.

At the conclusion of the washing operation a predetermined hydrate content is established in the crude pulp. This is preferably accomplished by adding barium hydrate $(Ba(OH)_2)$ to the crude pulp until titration tests indicate the desired hydrate content. It is highly desirable to use a good grade of barium hydrate for this purpose so as to keep the sulfhydrate radical as low as possible. The hydrate content established in the pulp will depend, to some extent, upon the degree of moisture to be left in the dried crude zinc sulphide. Thus, when in the subsequent drying operation substantial percentages (say 4 to 10%) of moisture are to be left in the dried crude zinc sulphide, the predetermined hydrate content of the crude pulp may be lower than when the drying is conducted to produce a dried crude zinc sulphide of one percent, or less, moisture.

The hydrate determination may advantageously be made by titrating the filtrate of a sample of the crude pulp with 0.25 N (one-fourth normal) hydrochloric acid. After the final decantation, barium hydrate is added to the crude pulp until titration tests indicate the desired predetermined excess of hydrate. In the practice of the invention the hydrate content of the crude pulp is advantageously confined to that indicated when from 1 cc. to 10 cc. of the 0.25 N hydrochloric acid are used in the titration test. In my preferred practice, the moisture content of the dried crude zinc sulphide is from 4 to 10%, and in this case the desired predetermined hydrate content is established in the crude pulp when from 3.0 to 4.0 cc. of 0.25 N hydrochloric acid are used in the titration test. The establishment of this predetermined hydrate content in the crude pulp, preferably by the addition of barium hydrate, is highly desirable and indeed necessary, in order to maintain the zinc sulphide product alkaline at all times during the following calcining operation. If the zinc sulphide becomes neutral or slightly acid during the calcining operation, the finished product will have a distinctly inferior light-resistance.

The crude pulp, after dilution, washing, final decantation, and establishment of hydrate content, as hereinbefore described, is filter-pressed. In accordance with my preferred practice, the press-cake from the crude pulp filters contains about 40 to 50% moisture or water. The press-cake is dried in any appropriate apparatus, but the drying operation is preferably so conducted and controlled as to leave in the dried crude zinc sulphide a moisture or water content of from 4 to 10%.

The dried crude zinc sulphide is preferably calcined in an apparatus of the vertical retort type such as described in the United States patent of Singmaster and Breyer, No. 1,411,-647, dated April 4, 1922, for the calcination of lithopone. The temperature of calcination is preferably from 650 to 725° C. The calcined zinc sulphide is suddenly cooled by quenching in cold water and is subjected to further treatment, such as washing, milling, drying and disintegrating, much in accordance with the present customary practice in lithopone manufacture.

The zinc sulphide should be alkaline when discharged from the calcining apparatus into the quenching water. When the zinc sulphide comes through the calcining apparatus neutral or acid, it is an indication that oxidation has taken place in either the drying or calcining operation, and the light-resistance of the zinc sulphide is thereby deleteriously affected. An excessive amount of barium sulfhydrate in the water in which the crude zinc sulphide is finally suspended, prior to filtration, tends to destroy or inhibit the desired degree of alkalinity in the calcined product. Barium sulfhydrate is readily converted into acidic substances upon oxidation, and it is therefore important to avoid not only excessive amount of barium sulfhydrate but also oxidizing conditions in the drying and more particularly in the calcining of the zinc sulphide. The alkalinity of the calcined zinc sulphide may conveniently be tested by taking a sample from the quenching tubs and shaking phenolphthalein thereon. The sample should show a uniform alkalinity, that is, uniformly alkaline throughout rather than merely alkaline in spots. It is my preferred practice to impart to the finished zinc sulphide pigment that degree of alkalinity imparted to lithopone according to U. S. Patent No. 1,446,637 of myself and Frank G. Breyer, dated February 27, 1923.

The pigment zinc sulphide product produced in accordance with the preferred practice hereinbefore described possesses superior color, brightness, hiding power and light resistance and is a most desirable white pigment for paint purposes.

While it is my preferred practice to precipitate the crude zinc sulphide from solutions of zinc chloride and barium sulphide, other soluble sulphides, such as sodium sulphide, may be substituted for the barium sulphide solution. In any case, the crude pulp at the completion of the precipitating step will contain a large quantity of dissolved chloride. By the prompt dilution and subsequent washing steps of the invention, this dissolved chloride is prevented from exercising any harmful effect upon the light-resistance or other properties of the finished pigment. The desired alkalinity of the finished product is assured by establishment of the predetermined hydrate content in the washed crude pulp and by the retention of from 4 to 10% of moisture in the dried crude precipitate and by calcination in the absence of oxidizing influences and preferably in an atmosphere of the gases (chiefly water vapor) evolved during the calcination. The temperature of calcination should be sufficiently high to give the finished pigment a high degree of strength or hiding power for paint purposes, but not so high that resistance to light is impaired. Under the controlled operating conditions hereinbefore described, a calcining temperature of from 650 to 725° C. is suitable for these ends.

I claim:

1. The process of making pigment zinc sulphide which comprises mixing solutions of zinc chloride and a soluble sulphide, washing the resulting zinc sulphide precipitate until the chlorine content of the liquor in which the precipitate is suspended amounts to 0.1 to 0.2 grams per liter, drying the thus washed precipitate, and calcining the dried precipitate.

2. The process of making pigment zinc sulphide which comprises mixing solutions of zinc chloride and a soluble sulphide, washing the resulting zinc sulphide precipitate until the chlorine content of the liquor in which the precipitate is suspended does not exceed 0.5 grams per liter, drying the thus washed precipitate, and calcining the dried precipitate.

3. The process of making pigment zinc sulphide which comprises mixing solutions of zinc chloride and barium sulphide, washing the resulting zinc sulphide precipitate until the chlorine content of the liquor in which the precipitate is suspended does not exceed 0.2 grams per liter, drying the thus washed precipitate, and calcining the dried precipitate at a temperature of about 650 to 725° C.

4. The process of making pigment zinc sulphide which comprises mixing solutions of zinc chloride and a soluble sulphide, diluting the resulting pulp containing the precipitated zinc sulphide with water promptly after the completion of the precipitating step, washing the zinc sulphide precipitate until the chlorine content of the liquor in which the precipitate is suspended does not exceed 0.5 grams per liter, drying the thus washed precipitate, and calcining the dried precipitate.

5. The process of making pigment zinc sulphide which comprises mixing solutions of zinc chloride and barium sulphide, diluting the resulting pulp containing the precipitated zinc sulphide with water promptly after the completion of the precipitating step, washing the zinc sulphide precipitate until the chlorine content of the liquor in which the precipitate is suspended does not exceed 0.2 grams per liter, drying the thus washed precipitate, and calcining the dried precipitate at a temperature of about 650 to 725° C.

6. The process of making pigment zinc sulphide which comprises bringing solutions of zinc chloride and a soluble sulphide in precipitating contact with each other under such controlled conditions of mixing that the resulting zinc sulphide precipitate contains a relatively large number of uniformly aggregated particles composed of from 2 to 8 individual particles, washing the zinc sulphide precipitate until the chlorine content of the liquor in which the precipitate is suspended amounts to 0.1 to 0.2 grams per liter, drying the thus washed precipitate, and calcining the dried precipitate.

7. The process of making pigment zinc sulphide which comprises mixing solutions of zinc chloride and a soluble sulphide with a minimum degree of agitation and thereby producing a zinc sulphide precipitate containing a relatively large number of uniformly aggregated particles composed of from 2 to 8 individual particles, washing the zinc sulphide precipitate until the chlorine content of the liquor in which the precipitate is suspended does not exceed 0.5 grams per liter, drying the thus washed precipitate, and calcining the dried precipitate.

8. The process of making pigment zinc sulphide which comprises mixing solutions of zinc chloride and barium sulphide with such gentle stirring that the resulting zinc sulphide precipitate contains a relatively large number of uniformly aggregated particles composed of from 2 to 8 individual particles, washing the zinc sulphide precipitate until the chlorine content of the liquor in which the precipitate is suspended does not exceed 0.2 grams per liter, drying the thus washed precipitate, and calcining the dried precipitate at a temperature of about 650 to 725° C.

9. The process of making pigment zinc sulphide which comprises mixing solutions of zinc chloride and a soluble sulphide, washing the resulting zinc sulphide precipitate until the chlorine content of the liquor in which the precipitate is suspended does not exceed 0.5 grams per liter, establishing in the liquor in which the zinc sulphide precipitate is finally suspended after the washing operation, a hydrate content equivalent to not more than 10 cc. of 0.25 N hydrochloric acid per 250 cc. of filtrate determined by titration of the filtrate from a sample of the pulp, drying the thus treated precipitate, and calcining the dried precipitate.

10. The process of making pigment zinc sulphide which comprises mixing solutions of zinc chloride and a soluble sulphide, washing the resulting zinc sulphide precipitate until the chlorine content of the liquor in which the precipitate is suspended does not exceed 0.5 grams per liter, establishing in the liquor in which the zinc sulphide precipitate is finally suspended after the washing operation a hydrate content equivalent to 3.0 to 4.0 cc. of 0.25 N hydrochloric acid per 250 cc. of filtrate determined by titration of the filtrate from a sample of the pulp, drying the thus treated precipitate, and calcining the dried precipitate.

11. The process of making pigment zinc sulphide which comprises mixing solutions of zinc chloride and barium sulphide, washing the resulting zinc sulphide precipitate until the chlorine content of the liquor in which the precipitate is suspended does not exceed 0.2 grams per liter, establishing in the liquor in which the zinc sulphide precipitate is finally suspended after the washing operation a hydrate content equivalent to 3.0 to 4.0 cc. of 0.25 N hydrochloric acid per 250 cc. of filtrate determined by titration of the filtrate from a sample of the pulp, drying the thus treated precipitate, and calcining the dried precipitate at a temperature of about 650 to 725 ° C.

12. The process of making pigment zinc sulphide which comprises mixing solutions of zinc chloride and a soluble sulphide, establishing in the crude pulp at the end point of the precipitating step an excess of soluble sulphide equivalent to 1.0 to 1.5 cc. of 0.1 N iodine solution per 25 cc. of filtrate determined by titration of the filtrate from a sample of crude pulp precipitated at a temperature of about 75° C. from a zinc chloride solution of 50 to 60° Bé. and a soluble sulphide solution of about 14° Bé., washing the resulting zinc sulphide precipitate until the chlorine content of the liquor in which the precipitate is suspended does not exceed 0.5 grams per liter, drying the thus washed precipitate, and calcining the dried precipitate.

13. The process of making pigment zinc sulphide which comprises mixing solutions of zinc chloride and a soluble sulphide, washing the resulting zinc sulphide precipitate until the chlorine content of the liquor in which the precipitate is suspended does not exceed 0.5 grams per liter, establishing in the liquor in which the zinc sulphide precipitate is finally suspended after the washing operation, a hydrate content equivalent to 1.0 to 10.0 cc. of 0.25 N hydrochloric acid for 250 cc. of filtrate determined by titration of the filtrate from a sample of the pulp, drying the thus-treated precipitate, and calcining the dried precipitate.

14. The process of making pigment zinc sulphide which comprises mixing solutions of zinc chloride and a soluble sulphide, washing the resulting zinc sulphide precipitate until the chlorine content of the liquor in which the precipitate is suspended does not exceed 0.5 grams per liter, drying the thus washed precipitate to a moisture content of from 4 to 10%, and calcining the dried precipitate.

15. The process of making pigment zinc sulphide which comprises mixing solutions of zinc chloride and barium sulphide, diluting the resulting pulp containing the precipitated zinc sulphide with water promptly after the completion of the precipitating step, washing the zinc sulphide precipitate until the chlorine content of the liquor in which the precipitate is suspended does not exceed 0.2 grams per liter, establishing in the liquor in which the zinc sulphide precipitate is finally suspended after the washing operation a hydrate content equivalent to 3.0 to 4.0 cc. of 0.25 N hydrochloric acid per 250 cc. of filtrate determined by titration of the filtrate from a sample of the pulp, drying the thus treated precipitate to a moisture content of from 4 to 10%, and calcining the dried precipitate at a temperature of about 650–725° C.

In testimony whereof I affix my signature.

CLAYTON W. FARBER.